United States Patent
Bordes et al.

(10) Patent No.: US 11,729,417 B2
(45) Date of Patent: Aug. 15, 2023

(54) GENERALIZED BI-PREDICTION AND WEIGHTED PREDICTION

(71) Applicant: InterDigital VC Holdings, Inc., Wilmington, DE (US)

(72) Inventors: Philippe Bordes, Laille (FR); Fabrice Leleannec, Mouaze (FR); Tangi Poirier, Thorigne-Fouillard (FR); Philippe De Lagrange, Betton (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/280,218

(22) PCT Filed: Oct. 1, 2019

(86) PCT No.: PCT/US2019/053952
§ 371 (c)(1),
(2) Date: Mar. 26, 2021

(87) PCT Pub. No.: WO2020/072414
PCT Pub. Date: Apr. 9, 2020

(65) Prior Publication Data
US 2022/0060743 A1     Feb. 24, 2022

(30) Foreign Application Priority Data

Oct. 2, 2018 (EP) .................................. 18306297
Jan. 29, 2019 (EP) .................................. 19305108

(51) Int. Cl.
*H04N 19/577*     (2014.01)
*H04N 19/176*     (2014.01)
(Continued)

(52) U.S. Cl.
CPC ......... *H04N 19/577* (2014.11); *H04N 19/176* (2014.11); *H04N 19/44* (2014.11); *H04N 19/70* (2014.11)

(58) Field of Classification Search
CPC .... H04N 19/577; H04N 19/176; H04N 19/44; H04N 19/00
See application file for complete search history.

(56) References Cited

U.S. PATENT DOCUMENTS

2014/0198846 A1*   7/2014   Guo ..................... H04N 19/59
                                                            375/240.12
2015/0222921 A1*   8/2015   Sato .................... H04N 19/597
                                                            375/240.12

(Continued)

OTHER PUBLICATIONS

Anonymous, Series H: Audiovisual and Multimedia Systems—Infrastructure of audiovisual services—Coding of moving video: High Efficiency Video Coding, International Telecommunication Union, Recommendation ITU-T H.265, Oct. 2014, 540 pages.

(Continued)

*Primary Examiner* — Jessica M Prince
(74) *Attorney, Agent, or Firm* — Condo Roccia Koptiw LLP

(57) ABSTRACT

A decoding method is presented. At least one high level syntax element is decoded that indicates whether generalized bi-prediction applies for predicting blocks of a slice. A block is then decoded from said slice using generalized bi-prediction in the case where said at least one high level syntax element indicates to apply generalized bi-prediction.

14 Claims, 7 Drawing Sheets

(51) Int. Cl.
*H04N 19/44* (2014.01)
*H04N 19/70* (2014.01)

(56) References Cited

U.S. PATENT DOCUMENTS

| | | | |
|---|---|---|---|
| 2016/0255359 A1* | 9/2016 | Yu .......................... | H04N 19/91 375/240.15 |
| 2018/0332298 A1* | 11/2018 | Liu ........................ | H04N 19/70 |
| 2021/0037258 A1* | 2/2021 | Zhang .................. | H04N 19/577 |
| 2022/0038720 A1* | 2/2022 | Hashimoto .......... | H04N 19/105 |

OTHER PUBLICATIONS

Su et al, "CE4-related_Generalized Bi-Prediction Improvements combined from JVET-L0197 and JVET-L0296", Joint Video Experts Team (JVET) of ITU-T SG 16 WP 3 and ISO/IEC JTC 1/SC 29/WG 11, Document JVET-L0646-v5, 12th Meeting, Macao, China, Oct. 3, 2018, 6 pages.

Ye et al, "AHG13: On bi-prediction with weighted averaging and weighted prediction", Joint Video Experts Team of ITU-T SG 16WP3 and ISO/IEC JTC 29/WG11; 13th Meeting: Marrakech, Morocco, Jan. 9, 2019, Document JVET-M0111-v1, 6pages.

Chen et al., "CE4.4.1: Generalized bi-prediction for inter coding", Joint Video Experts Team (JVET) of ITU-T SG 16 WP 3 and ISO/IEC JTC 1/SC 29/WG 11, Document: JVET-K024S-v1, 11th Meeting: Ljubljana, Slovenia, Jul. 10, 2018, 4 pages.

Hashimoto et al., "Non-CE4: Weighted prediction with BDOF and bi-prediction with CU weights harmonization", Joint Video Experts Team (JVET) of ITU-T SG 16WP3 and ISO/IEC JTC 29/WG11, Document: JVET-M0067-v1, 13th Meeting: Marrakech, Morocco, Jan. 9, 2019, 6 pages.

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

CHEN et al, "Algorithm description for Versatile Video Coding and Test Model 2 (VTM 2)", Joint Video Experts Team (JVET) ITU-T SG16 WP3 and ISO/IEC JTC 1/SC 29/WG11, Document: JVET-K1002-v2, 11th Meeting: Ljubljana, Slovenia, Jul. 10, 2018, 21 pages.

* cited by examiner

FIGURE 1 – PRIOR ART

GENERALIZED BI-PREDICTION AND WEIGHTED PREDICTION

CROSS REFERENCE TO RELATED APPLICATIONS

This application is the national stage entry under 35 U.S.C. § 371 of International Application PCT/US20191053952, filed Oct. 1, 2019, which was published in accordance with PCT Article 21(2) on Apr. 9, 2020, in English, and which claims the benefit of European Patent Application No. 18306297.5, filed Oct. 2, 2018 and European Patent Application No. 19305108.3, filed Jan. 29, 2019.

1. TECHNICAL FIELD

At least one of the present embodiments generally relate to a method and a device for picture encoding and decoding, and more particularly, to a method and a device for picture encoding and decoding using bi-prediction.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding. In intra mode, the block prediction is computed using reconstructed samples of the current slice, tile or picture (e.g. neighboring samples to the current block) as depicted on top of FIG. 1. In inter mode, the block prediction is computed from at least on motion compensated (MC) block of one reference picture that was previously reconstructed as depicted in FIG. 1 (bottom).

3. BRIEF SUMMARY

According to a general aspect of at least one embodiment, a method for decoding video data is presented. The method comprises decoding a high level syntax element; decoding a bi-predicted block of a picture responsive to the high level syntax element; wherein decoding the high level syntax element comprises decoding a syntax element indicating whether generalized bi-prediction may apply for decoding blocks of the picture.

According to a general aspect of at least one embodiment, a method for decoding video data is presented. The method comprises
  decoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  decoding said block responsive to said deactivation.

According to a general aspect of at least one embodiment, a method for decoding video data is presented. The method comprises decoding an index representative of first and second generalized bi-prediction weights responsive to a high level syntax element; determining first and second predictors; combining the first and second predictors into a single predictor using the decoded first and second generalized bi-prediction weights; and reconstructing the bi-predicted block from the single predictor, wherein the high level syntax element comprises a syntax element indicating whether generalized bi-prediction may apply for decoding blocks of the picture.

According to a general aspect of at least one embodiment, a method for decoding video data is presented. The method comprises decoding an index representative of first and second generalized bi-prediction weights responsive to a high level syntax element; determining first and second predictors; applying weighted prediction on the first and second predictors; combining the first and second predictors into a single predictor using the decoded first and second bi-prediction generalized weights; and reconstructing the bi-predicted block from the single predictor, wherein the high level syntax element comprises a syntax element indicating whether generalized bi-prediction may apply for decoding blocks of the picture.

According to a general aspect of at least one embodiment, a method for encoding video data is presented. The method comprises obtaining and encoding a high level syntax element; encoding a bi-predicted block of a picture responsive to the high level syntax element; wherein encoding the high level syntax element comprises encoding a syntax element indicating whether generalized bi-prediction may apply for decoding blocks of the picture.

According to a general aspect of at least one embodiment, a method for encoding video data is presented. The method comprises:
  encoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  encoding said block responsive to said deactivation.

According to a general aspect of at least one embodiment, a decoding apparatus is presented. The decoding apparatus comprises one or more processors configured to perform:
  decoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  decoding said block responsive to said deactivation.

According to a general aspect of at least one embodiment, an encoding apparatus is presented. The encoding apparatus comprises one or more processors configured to perform:
  encoding a first high level syntax element indicating whether weighted prediction applies and a second high level syntax element indicating whether generalized bi-prediction applies for predicting blocks;

deactivating one of weighted prediction and generalized bi-prediction at a block level in the case where both said first and second high level syntax elements indicate weighted prediction and generalized bi-prediction apply; and encoding said block responsive to said deactivation.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for creating, transmitting or receiving the bitstream generated according to the encoding methods described above.

One or more embodiments also provide a computer program product including instructions for performing at least part of any of the methods described above.

4. BRIEF SUMMARY OF THE DRAWINGS

5. DETAILED DESCRIPTION

Figure 1:
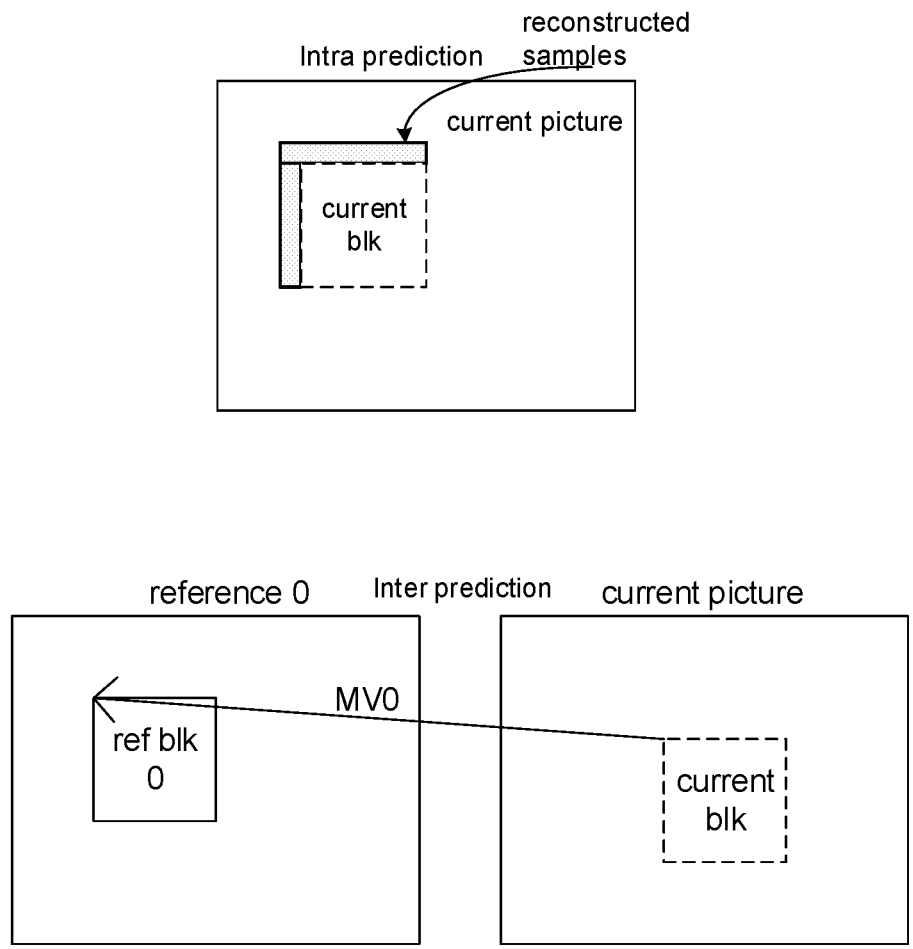
FIG. 1 illustrates intra and inter prediction according to the prior art.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a CU that may be further split into smaller CUs also named sub-CUs or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "frame", "tile" and "slice" may be used interchangeably. Usually, but not necessarily, the term "reconstructed" is used at the encoder side while "decoded" is used at the decoder side.

In Inter mode, bi-prediction comprises averaging two reference blocks for predicting a current block. Generalized Bi-prediction (GBI) is a variant of traditional bi-prediction that allows bi-prediction weights to be transmitted at the CU level. GBI thus comprises weighting the sum of block prediction samples with weights different from (½;½) as used in conventional bi-prediction. The weights may thus be defined by a Table. As an example, an index pointing to an entry of a table of weights or more generally to a defined set of weights may be encoded per block in the case where the block is coded in bi-prediction mode. GBI does not apply in uni-directional coding mode.

Weighted-Prediction (WP) comprises defining weights and offsets per slice for each reference picture in the Decoded Picture Buffer (DPB). WP is applied on the block prediction. The weights are fixed for all the references in one slice. WP can apply in both cases: uni-directional prediction or bi-prediction.

Bi-Prediction

In bi-prediction, two prediction blocks ($Pred_0$ and $Pred_1$) are computed using two reference pictures from lists L0 and L1 respectively. The reference picture used to compute $Pred_0$ has a reference index $ref_0$ and the reference picture used to compute $Pred_1$ has reference index a $ref_1$.

The predictors $Pred_0$ and $Pred_1$ are then combined into a single predictor $Pred_{bi}$. Traditionally, the combination as in (eq. 1) comprises averaging the two predictions:

$$Pred_{bi}=(½*Pred_0[x]+½*Pred_1[x]) \quad (1)$$

In a variant, implementation is adapted so as to use integer and shift operations as follows:

$$Pred_{bi}=(Pred_0[x]+Pred_1[x]+1)>>1 \quad (2)$$

where >> is a right shift operator.

Generalized Bi-Prediction

In generalized bi-prediction (GBI), the weights (w0 and w1) used for the combination are not necessarily equal to one:

$$Pred_{bi}=(w_0 \cdot Pred_0[x]+w_1 \cdot Pred_1[x]+off)/(w_0+w_1) \quad (3)$$

In a variant, (2) is simplified as follows to ease the implementation (use integer and shift operations):

$$Pred_{gbi} = (gw_0 \cdot Pred_0[x] + gw_1 \cdot Pred_1[x] + (1 << (gs-1))) >> gs \quad (4)$$

where << is a left shift operator.

The weights w0 and w1 may be different. As an example, w0 may be equal to w and w1 equal to (1−w) with weight values w listed in Table 1. An index gbi_index corresponding to the weight value may be encoded in the bitstream for each block. The syntax element gbi_index is coded for w1 (w0 being deduced from w1 as follows w0=1−w1 or equivalently using integer and shifts operations) using fixed binarization as specified for example in Table 1.

TABLE 1

| GBi Index | Weight value of $w_1$ | $gw_1$ | gs (shift) | Binarization of GBi Index |
|---|---|---|---|---|
| 0 | −¼ | −1 | 2 | 0000 |
| 1 | ⅜ | 3 | 3 | 001 |
| 2 | ½ | 1 | 1 | 1 |
| 3 | ⅝ | 5 | 3 | 01 |
| 4 | 5/4 | 5 | 2 | 0001 |

The syntax element gbi_index may be coded/decoded for each block/CU coded in inter bi-prediction. In some specific modes (e.g. merge mode), the value of gbi_index for a current block may be inferred from the value of gbi_index of a neighbor (more precisely from one of the merge candidates) from which the current CU inherits its parameters.

Weighted Uni-Directional Prediction and Weighted Bi-Prediction

Weights may also be determined from global Illumination Compensation, also known as "Weighted Prediction" (WP) tool. In this case, the weights are determined by the encoder and are fixed for a whole slice. They may be transmitted in the bitstream. The WP allows defining weights and offsets ($w_i$;off$_i$) per slice associated with each component of each reference picture "i" of each list (L0 and L1) stored in the Decoded Picture Buffer (DPB). The WP may then be applied on the block prediction. The weights and offsets are coded in the slice header. WP can apply in both cases: uni-directional prediction (eq. 5) and bi-prediction (eq. 6). In the case where the current CU is coded/decoded using uni-directional prediction with reference refIdx0 of list L0, one denote (w0;off0) the weight and offset associated with refIdx0. The predictor is determined as follows:

$$Pred'_0 = ((w_0 \cdot Pred_0[x] + (1 << (shift-1))) >> shift) + off_0 \quad (5)$$

In the case where the current CU is coded/decoded using bi-prediction with reference refIdx0 of list L0 and refIdx1 of list L1, one denote (w0;off0) the weight and offset associated with refIdx0 and (w1;off1) the weight and offset associated with refIdx1. The predictor is determined as follows:

$$Pred'_{01} = ((w_0 \cdot Pred_0[x] + w_1 \cdot Pred_1[x] + off_{01})) >> (shift+1) \quad (6)$$

where $off_{01} = (off_0 + off_1 + 1) << shift$ where shift is also transmitted in the bitstream.

GBI and WP have similar basic principles since they both modify the prediction samples through linear weighting with weights.

At least one embodiment proposes to make these two tools co-exist properly in the codec.

Figure 2:
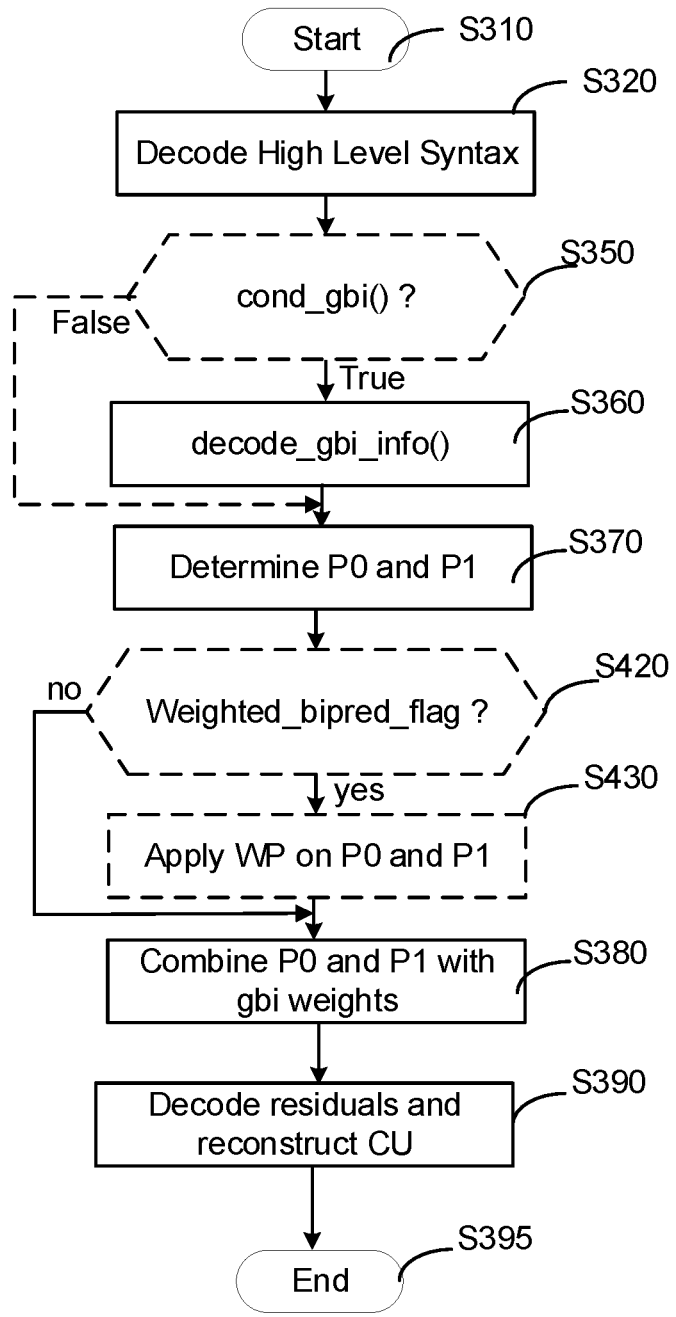
FIG. 2 depicts a flowchart of a decoding method according to an embodiment.

FIG. 2 represents a flowchart of a method for decoding a bi-predicted CU/block from a bitstream according to a specific and non-limiting embodiment.

The method starts at step S310. High level Syntax (HLS) elements are decoded (S320). The syntax elements that describe the structure of the bitstream or provide information that applies to multiple pictures or to multiple coded block regions within a picture, such as the parameter sets, are known as the "high-level syntax" part of HEVC. Sequence Parameters Set (SPS), Pictures Parameters Set (PPS), Tile Header, or Slice Header (SH) are examples of HLS. In an embodiment, flags weighted_pred_flag and weighted_bipred_flag are decoded (S320). They indicate whether WP may be used to decode CUs of subsequent slices. In the same way, additional flags generalized_bi_prediction_flag and gbi_enabled_flag may be decoded (S320). As an example, generalized_bi_prediction_flag may be decoded from the PPS and gbi_enabled_flag may be decoded from a SH. They indicate whether GBI may apply for CUs of subsequent slices. Examples of PPS and SH syntaxes are proposed in Table 2 and Table 3.

TABLE 2

| pic_parameter_set_rbsp( ) { | Descriptor |
|---|---|
| pps_pic_parameter_set_id | ue(v) |
| pps_seq_parameter_set_id | ue(v) |
| ... | |
| weighted_pred_flag | u(1) |
| weighted_bipred_flag | u(1) |
| generalized_bi_prediction_flag | u(1) |
| ... | |
| } | |

TABLE 3

| slice_segment_header( ) { | Descriptor |
|---|---|
| first_slice_segment_in_pic_flag | u(1) |
| if ( slice_type == P \|\| slice type == B ) { | |
|   if ( ( weighted_pred_flag && slice_type == P) \|\| | |
|     ( weighted_bipred_flag && slice_type == B ) ) | |
|     pred_weight_table( ) | |
|   ... | |
| } | |
| if ( slice_type == B && generalized_bi_prediction_flag) { | |
|   gbi_enabled_flag | u(1) |
| } | |
| else { | |
|   gbi_enabled_flag = false | |
| } | |

At S360, GBI parameters are decoded. In an embodiment, GBI parameters (e.g. gbi_index) may be decoded at the CU level.

In another embodiment, additional conditions cond_gbi( ) (S350) may be specified at coding unit (CU) level. cond_gbi( ) is a function of CU parameters which returns a boolean indicating whether gbi_index is coded explicitly or not. For example, in the case where CU is coded in merge mode, the cond_gbi( ) is false.

In the case where cond_gbi( ) is true (i.e. GBI parameters are present in the bitstream), the method continues at S360 to decode the GBI parameters. Otherwise (cond_gbi( ) is false), the method continues at S370.

Predictors P0 and P1 (S370) are determined. The predictor P0 is obtained by motion compensating a first reference block in a first reference image. The predictor P1 is obtained by motion compensating a second reference block in a second reference image. The motion vectors used for the motion compensation are decoded from the bitstream.

In the case where GBI is applicable, the method continues at S380. The two predictors P0 and P1 are combined into a single predictor (S380) using the GBI parameters, i.e. the weights determined by gbi_index.

In the case where, GBI is not applicable, the two predictors are combined into a single predictor using default weights (e.g. conventional bi-prediction).

At S390, the CU is reconstructed. To this aim, residuals are decoded from the bitstream if not already decoded at S330. The residuals are added to the predictor to obtain the reconstructed CU.

The method ends at step S395.

In a variant, weighted prediction may also apply. In the case where WP applies (S420) for bi-prediction (e.g weighted_bipred_flag is true), the method continues at S430. Otherwise the method continues at S380.

At S430, WP is applied on the predictors P0 and P1, i.e. P0 and P1 are weighted using WP weights and offsets.

In the case where GBI is applicable, the method continues at S380. The two predictors P0 and P1 after WP are combined into a single predictor (S380) using the GBI parameters, i.e. the weights determined by gbi_index.

Figure 3:
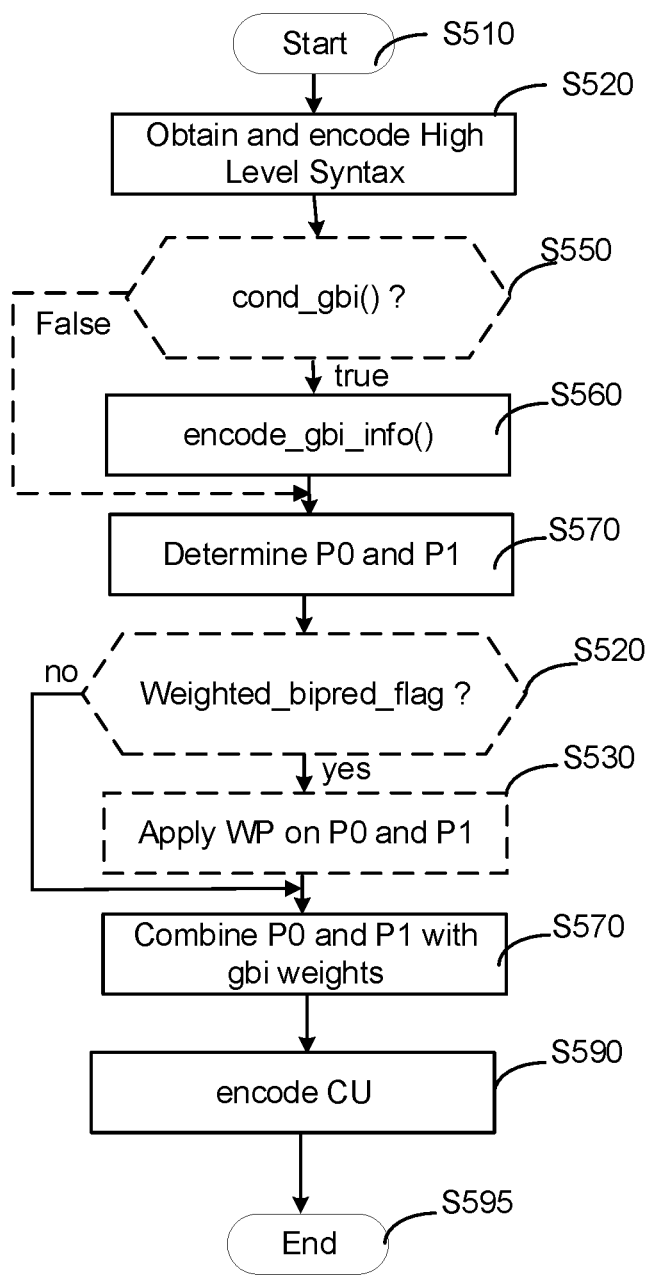
FIG. 3 depicts a flowchart of an encoding method according to an embodiment.

FIG. 3 represents a flowchart of a method for encoding a bi-predicted CU/block from a bitstream according to a specific and non-limiting embodiment.

The method starts at step S510. High level Syntax (HLS) elements are obtained and encoded (S520). Sequence Parameters Set (SPS), Pictures Parameters Set (PPS), Tile Header or Slice Header (SH) are examples of HLS. In an embodiment, flags weighted_pred_flag and weighted_bipred_flag are obtained and encoded (S520). They indicate whether WP may be used to encode CUs of subsequent slices. In the same way, additional flags generalized_bi_prediction_flag and gbi_enabled_flag may be obtained and encoded (S520). As an example, generalized_bi_prediction_flag may be encoded in the PPS and gbi_enabled_flag may be encoded in a SH. They indicate whether GBI may apply for CUs of subsequent slices. Examples of PPS and SH syntaxes are proposed in Table 2 and Table 3. The choice to apply or not GBI and WP, the determination of the weight and offset values may be done by rate distortion optimization.

At S560, GBI parameters are encoded. In an embodiment, GBI parameters (e.g. gbi_index) may be encoded at the CU level.

In another embodiment, additional conditions cond_gbi( ) (S550) may be specified at coding unit (CU) level. cond_gbi( ) is a function of CU parameters which returns a boolean indicating whether gbi_index is coded explicitly or not.

In the case where cond_gbi( ) is true (i.e. GBI parameters are present in the bitstream), the method continues at S560 to encode the GBI parameters. Otherwise (cond_gbi( ) is false), the method continues at S570.

Predictors P0 and P1 (S570) are determined. The predictor P0 is obtained by motion compensating a first reference block in a first reference image. The predictor P1 is obtained by motion compensating a second reference block in a second reference image. The motion vectors used for the motion compensation are obtained by motion estimation and are encoded in the bitstream. In the case where GBI is applicable, the method continues at S580.

The two predictors P0 and P1 are combined into a single predictor (S580) using the GBI parameters, i.e. the weights determined by gbi_index. In the case where, GBI is not applicable the two predictors are combined into a single predictor using default weights (e.g. conventional bi-prediction).

At S590, the CU is encoded. To this aim, residuals are encoded (transformed, quantized and entropy coded) in the bitstream. The residuals are obtained by subtracting the predictor from the CU.

The method ends at step S595.

In a variant, weighted prediction may also apply. In the case where WP applies (S520) for bi-prediction (e.g weighted_bipred_flag is true), the method continues at S530. Otherwise the method continues at S580.

At S530, WP is applied on the predictors P0 and P1, i.e. P0 and P1 are weighted using WP weights and offsets.

In the case where GBI is applicable, the method continues at S580. The two predictors P0 and P1 after WP are combined into a single predictor (S580) using the GBI parameters, i.e. the weights determined for gbi_index.

Figure 4:
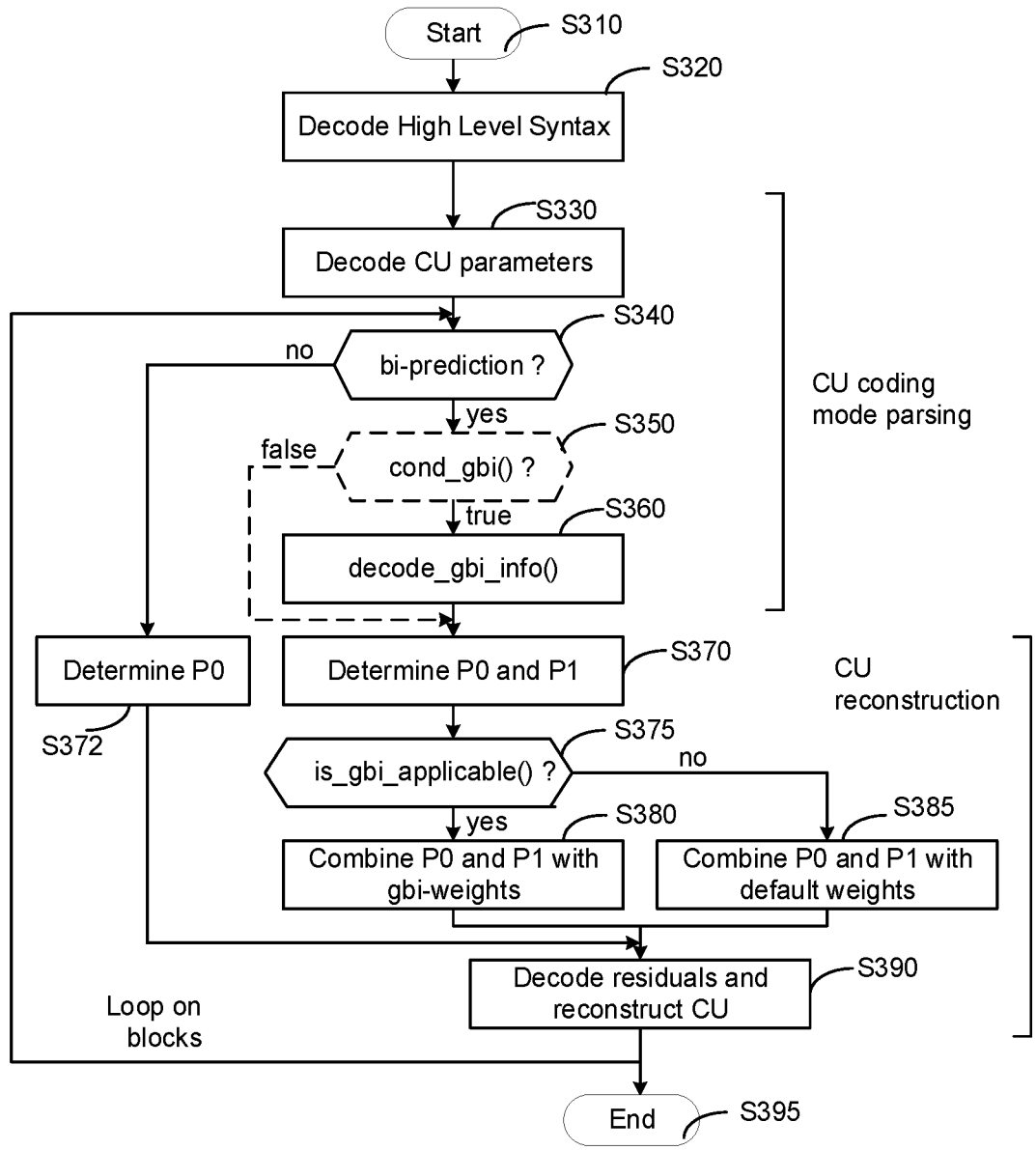
FIGS. 4 and 5 depict flowcharts of a decoding method according to various embodiments.

FIG. 4 represents a flowchart of a method for decoding a CU/block from a bitstream according to a specific and non-limiting embodiment.

The method starts at step S310. High level Syntax (HLS) elements are decoded (S320). Sequence Parameters Set (SPS), Pictures Parameters Set (PPS), Tile Header or Slice Header (SH) are examples of HLS. In an embodiment, flags weighted_pred_flag and weighted_bipred_flag are decoded (S320). They indicate whether WP may be used to decode CUs of subsequent slices. In the same way, additional flags generalized_bi_prediction_flag and gbi_enabled_flag may be decoded (S320). As an example, generalized_bi_prediction_flag may be decoded from the PPS and gbi_enabled_flag may be decoded from a SH. They indicate whether GBI may apply for CUs of subsequent slices. Examples of PPS and SH syntaxes are proposed in Table 2 and Table 3.

Parameters (coding modes, motion vectors, etc) of a current CU are then decoded (S330). In an embodiment, all parameters associated with a current CU are decoded. In a variant, only a subset of them (e.g. parameter indicating whether the current CU is bi-predicted) is decoded.

In the case where the CU is bi-predicted (S340) the method continues at S350 (if S350 is present) or at S360 (if S350 is not present). Otherwise the method continues at S372. In case of uni-directional prediction (S372), a single predictor P0 is determined.

At S360, GBI parameters are decoded. In an embodiment, GBI parameters (e.g. gbi_index) may be decoded at the CU level as disclosed in tables 4 and 5. The set of GBI parameters is decoded by decode_gbi_info( ). The number of possible weights max_gbi_index (i.e. maximum value of gbi_index) may be reduced in some conditions. Therefore, max_gbi_index may also be a parameter decoded by decode_gbi_info( ). In another example, max_gbi_index is a function of the current POC (Picture Order Count) and the reference POC.

In another embodiment, the table of gbi_index to use is inferred from other CU parameters such as current POC.

TABLE 4

| coding unit( ) { | Descriptor |
|---|---|
| mode | u(1) |
| ... | |
| If( mode == inter_bi ) { | |
|   if ( gbi_enabled_flag) | |
|     decode_gbi_info( ) | |
| ... | |
| } | |

TABLE 5

| decode_gbi_info( ) { | Descriptor |
|---|---|
| gbi_index | ue(v) |
| ... | |
| } | |

In another embodiment, additional conditions cond_gbi( ) (S350) may be specified at coding unit (CU) level. Thus table 3 is replaced by table 5. cond_gbi( ) is a function of CU parameters which returns a boolean indicating whether gbi_index is coded explicitly or not. Indeed, GBI parameters such as gbi_index may be coded explicitly or inferred as in the case of merge mode for example. GBI may also be disabled by cond_gbi( ) (Table 6). For example, cond_gbi( ) may disable GBI (gbi_enabled_flag set to false) for small blocks (number of samples <256). In this case, the weights may be set to default weights as used in conventional bi-prediction (S385). In case of merge mode, cond_gbi( ) returns false, gbi_index is determined from gbi_index of one neighbor CU, namely the selected merge candidate.

TABLE 6

| coding_unit( ) { | Descriptor |
|---|---|
| mode | u(1) |
| ... | |
| If ( mode == inter_bi ) { | |
|   if ( gbi_enabled_flag && cond_gbi( ) ) | |
|     decode_gbi_info( ) | |
| ... | |
| } | |

In the case where cond_gbi( ) is true (i.e. GBI parameters are present in the bitstream), the method continues at S360 to decode the GBI parameters. Otherwise (cond_gbi( ) is false), the method continues at S370.

Predictors P0 and P1 (S370) are determined. The predictor P0 is obtained by motion compensating a first reference block in a first reference image. The predictor P1 is obtained by motion compensating a second reference block in a second reference image. The motion vectors used for the motion compensation are decoded from the bitstream (S330). In the case where GBI is applicable (S375), the method continues at S380.

The two predictors P0 and P1 are combined into a single predictor (S380) using the GBI parameters, i.e. the weights determined by gbi_index.

In the case where, GBI is not applicable (S375) the method continues at S385.

The two predictors are combined into a single predictor (S385) using default weights (e.g. conventional bi-prediction).

At S390, the CU is reconstructed. To this aim, residuals are decoded from the bitstream if not already decoded at S330. The residuals are added to the predictor to obtain the reconstructed CU.

The method ends at step S395.

In one embodiment, GBI is disabled in the case where WP is enabled as illustrated in an example by Table 7 which is a variant of Table 2. Indeed, enabling both WP and GBI for a bi-predicted block may increase implementation complexity.

TABLE 7

| pic_parameter_set_rbsp( ) { |
|---|
|   pps_pic_parameter_set_id |

TABLE 7-continued

|   pps_seq_parameter_set_id |
|---|
|   ... |
|   weighted_pred_flag |
|   weighted_bipred_flag |
|   if ( !weighted bipred flag) |
|     generalized_bi_prediction_flag |
|   else |
|     generalized_bi_prediction_flag = false |

In the case where WP is enabled (i.e. weighted_bipred_flag is equal to 1 or true), then generalized_bi_prediction_flag=false. Otherwise, generalized_biprediction_flag is decoded from the bitstream.

In a variant, GBI-WP mutual exclusion can be implemented at the CU level based on current CU parameters (is_gbi_applicable( ) at S375). Then one can have both weighted_bipred_flag and generalized_bi_pred_flag equal to true, but WP and GBI are not activated/applied together at CU level, i.e. one of them is deactivated or said otherwise only one of them is activated/applied, thus only one of them applies at the CU level. In case of GBI-WP mutual exclusion, deactivating one of GBI and WP at the CU level is identical to activating/applying a single one among WP and GBI. For example, in the case of bi-prediction and if is_gbi_applicable( )=true then WP is not applied (even if weighted_bipred_flag=true), i.e. WP is deactivated, thus does not apply while GBI is activated, thus applies.

For example, in case of bi-prediction with weighted_bipred_flag=false or in the case where weighted_bipred_flag is true and the WP weights and offsets (w0;off0) (w1;off1) are equal to (1;0) then is_gbi_applicable( ) is set to true, i.e. WP is deactivated, thus does not apply, while GBI is activated, thus applies.

For example, in case of bi-prediction with weighted_bipred_flag=true in the case where weighted_bipred_flag is true and at least one (w0;off0) or (w1;off1) is not equal to (1;0) then is_gbi_applicable( ) is set to false, i.e. WP is activated, thus applies while GBI is deactivated, thus does not apply.

Figure 5:
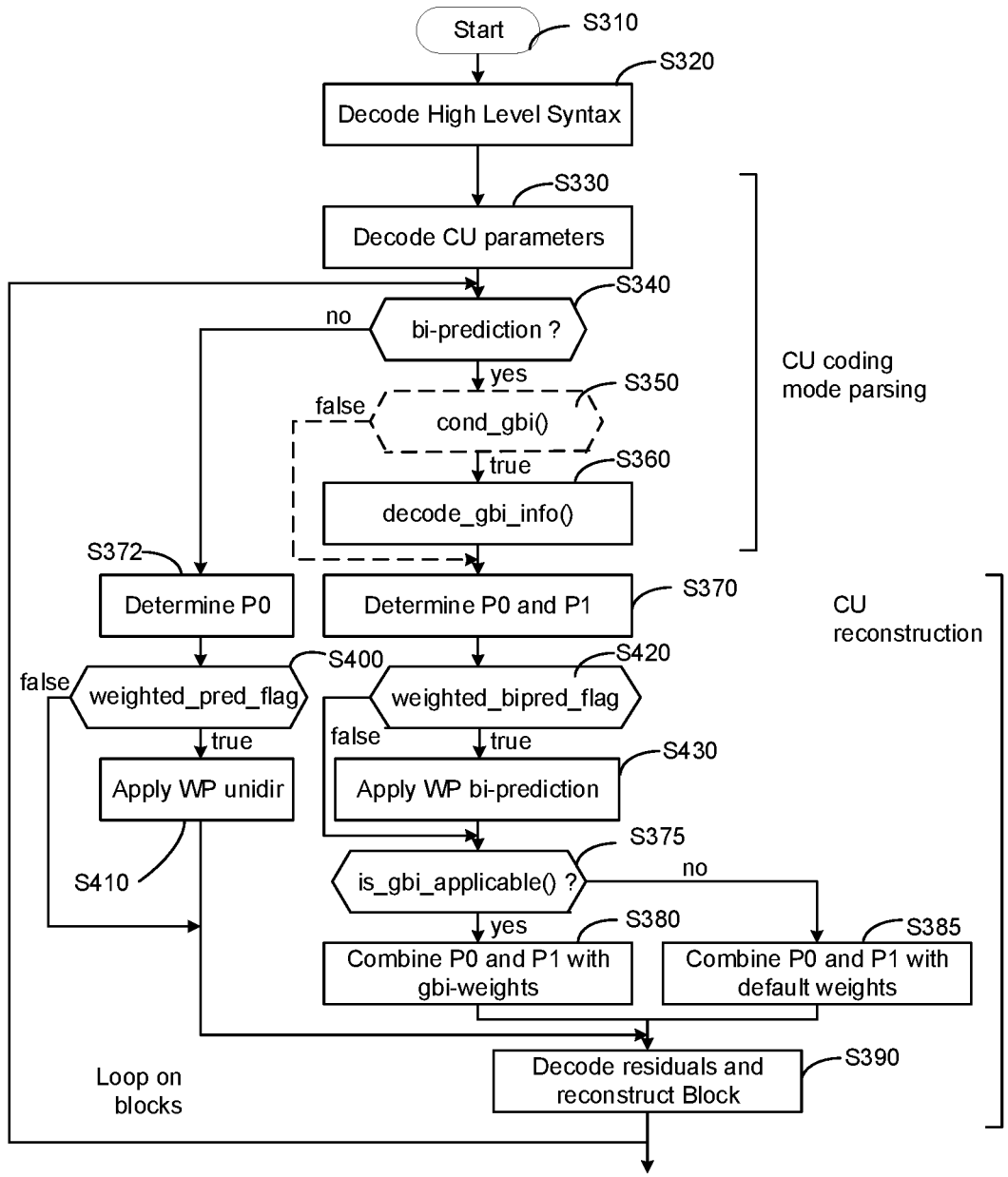

FIG. 5 represents a flowchart of a method for decoding a CU/block from a bitstream according to a specific and non-limiting embodiment. In this embodiment, both GBI and WP are enabled together for bi-prediction. WP is applied first, then GBI is applied. The steps of FIG. 3 identical to the steps of FIG. 2 are identified with the same numerical references and are not further disclosed.

The method starts at step S310. High level Syntax (HLS) elements are decoded (S320). Sequence Parameters Set (SPS), Pictures Parameters Set (PPS), Tile Header or Slice Header (SH) are examples of HLS. Parameters (coding modes, motion vectors, etc) of a current CU are then decoded (S330).

In the case where the CU is bi-predicted (S340) the method continues at S350 (if S350 is present) or at S360 (if S350 is not present). Otherwise (CU is not bi-predicted), the method continues at S372. In case of uni-directional prediction (S372), a single predictor P0 is determined. In the case where weighted_pred_flag is true (S400) the method continues at S410. Otherwise the method continues at S390. At S410, WP is applied on the predictor P0, i.e. P0 is weighted using WP weight and offset.

In the case where cond_gbi( ) is true (i.e. GBI parameters are present in the bitstream), the method continues at S360 to decode the GBI parameters. Otherwise (cond_gbi( ) is false), the method continues at S370. At S360, GBI parameters (e.g. gbi_index) are decoded.

Predictors P0 and P1 (S370) are determined. The predictor P0 is obtained by motion compensating a first reference block in a first reference image. The predictor P1 is obtained by motion compensating a second reference block in a second reference image. The motion vectors used for the motion compensation are decoded from the bitstream (S330).

In the case where WP applies (S420) for bi-prediction (e.g weighted_bipred_flag is true), the method continues at S430. Otherwise the method continues at S375.

At S430, WP is applied on the predictors P0 and P1, i.e. P0 and P1 are weighted using WP weights and offsets. In one embodiment (V0), WP is applied on the predictors P0 (also denoted Pred'0) and P1 (also denoted Pred'1) at S430 as follows:

Pred'0=((w0·Pred0[x]+(1<<(shift−1)))>>shift)+off0

Pred'1=((w1·Pred1[x]+(1<<(shift−1)))>>shift)+off1

In the case where GBI is applicable (S375), the method continues at S380. The two predictors P0 and P1 are combined into a single predictor Pred" (S380) using the GBI parameters, i.e. the weights determined by gbi_index. GBI is thus applied at S380 as follows (V0):

Pred"=(gw0·Pred'0[x]+gw1·Pred'1[x]+(1<<(gs−1)))>>gs

In the case where, GBI is not applicable (S375) the method continues at S385. The two predictors are combined into a single predictor (S385) using default weights (e.g. conventional bi-prediction).

At S390, the CU is reconstructed. To this aim, residuals are decoded from the bitstream if not already decoded at S330. The residuals are added to the predictor to obtain the reconstructed CU.

The method ends at step S395.

In another embodiment (V1), Pred" may be computed all-in-one (i.e. WP and GBI) as follows:

Pred"=(GW0·Pred0[x]+GW1·Pred1[x]+OFF0+OFF1+(1<<(GS−1)))>>GS where $GW0=gw0 \times w0, GW1=gw1 \times w1$ and $GS=shift+gs$ OFF0=gw0×(off0<<shift) and OFF1=gw1×(off1<<shift)

This embodiment improves the precision. However, it may overflow the intermediate storage memory when computing (GW0·Pred0[x]+GW1·Pred1 [x]+OFF0+OFF1+(1<<(GS−1))) or it uses high number of bits.

Thus, in another embodiment (V2), intermediate precision can be implemented as follows.

Pred'0=w0·Pred0[x]+(1<<(shift−S−1)))>>(shift−S))+(off0<<S)     S430:

Pred'1=((w1·Pred1[x]+(1<<(shift−S−1)))>>(shift−S))+(off1<<S)

Pred"=(gw0·Pred'0[x]+gw1·Pred'1[x]+(1<<(gs+S−1)))>>(gs+S)     S380:

where 0<S<shift.

In this way, the number of bits used to store the intermediate result "gw0·Pred'0[x]+gw1·Pred'1[x]+(1<<(gs−1))" is inferior to the number of bits used in previous embodiment, while the precision remains superior to V0, though but inferior to V1.

In yet another embodiment, the weights and offsets can be tabulated into two 3-dimensional LUTs (TableWeight, TableOffset) and one 1-Dimensional LUT (TableShift) to facilitate the implementation:

GW0=TableWeight[0][idxRef0][numGbiIdx−1−gbiIdx]

GW1=TableWeight[1][idxRef1][gbiIdx]

OFF0=TableOffset[0][idxRef0][numGbiIdx−1−gbiIdx]

OFF1=TableOffset[1][idxRef1][gbiIdx]

GS=TableShift[gbiIdx]

In yet another embodiment, one can code an additional flag per CU indicating whether WP apply for the current CU.

In another embodiment, GBI and WP are combined so that one uses the same generic bi-prediction weighting formula as in (V1):

Pred"=(GW0·Pred0[x]+GW1·Pred1[x]+OFF0+OFF1+(1<<(GS−1)))>>GS

However, some adaptations are made to reduce the number of bits used to store the intermediate value "GW0·Pred0[x]+GW1·Pred1[x]+OFF0+OFF1+(1<−(GS−1))". In this embodiment, the GBI table contains weights difference (delta) with respect to default weights. When WP is disabled, then default weighting is ½ (w=1, s=1). When WP is enabled, then default weight is w0 or w1 associated with the reference index. The example described in Table 1 is modified as follows (Table 8):

TABLE 8

| GBi Index | Delta Weight of w1 | value dw1 | gw1 | gs (shift) | Binarization of GBi Index |
|---|---|---|---|---|---|
| 0 | −¼ − ½ = −¾ | −3 | −1 | 2 | 0000 |
| 1 | ⅜ − ½ = −⅛ | −1 | 3 | 3 | 001 |
| 2 | ½ − ½ = 0 | 0 | 1 | 1 | 1 |
| 3 | ⅝ − ½ = ⅛ | 1 | 5 | 3 | 01 |
| 4 | 5/4 − ½ = ¾ | 3 | 5 | 2 | 0001 |

When WP is disabled, then one has default weights (w0=1) and (w1=1), shift (s=1)

Pred"=((w0+dw)·Pred0[x]+(w1−dw)·Pred1[x]+(1<<(gs−1)))>>gs

Pred"=(GW0·Pred0[x]+GW1·Pred1[x]+OFF0+OFF1+(1<<(GS−1)))>>GS

With: $GW_0=w_0 \cdot (1<<(gs-1))-dw1$ $GW_1=w_1 \cdot (1<<(gs-1))+dw_1$

OFF0=OFF1=0

GS=gs

When WP is enabled, the values of refIdx0 and refIdx1 of the current CU gives the WP weighting (w0, w1, s) and offsets (off0,off1).

a) If s<gs, then one has:

$GW_0=w_0 \cdot (1<<(gs-s))-dw1$ $GW_1=w_1 \cdot (1<<(gs-s))+dw_1$

OFF0=(off1<<gs) OFF1=(off0<<gs)

GS=gs b) If s>gs, then one has:

$$GW_0 = w_0 - dw1 \cdot (1 << (s-gs)) \; GW_1 = w_1 + dw_1 \cdot (1 << (s-gs))$$

$$OFF0 = (off1 << s) \; OFF1 = (off0 << s)$$

$$GS = s$$

With this method, the number of bits used to compute "$GW_0 \cdot Pred_0[x] + GW_1 \cdot Pred_1[x] + OFF0 + OFF1 + (1 << (GS-1))$" is inferior to the number of bits used in the embodiment (V1) where WP is applied first followed by GBI.

In a variant, the value of the shifts gs and s are equal, so that one can always use a) or b). For example, gs=s=4.

The embodiments of FIGS. 4 and 5 are also applicable to the encoder side.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 6:
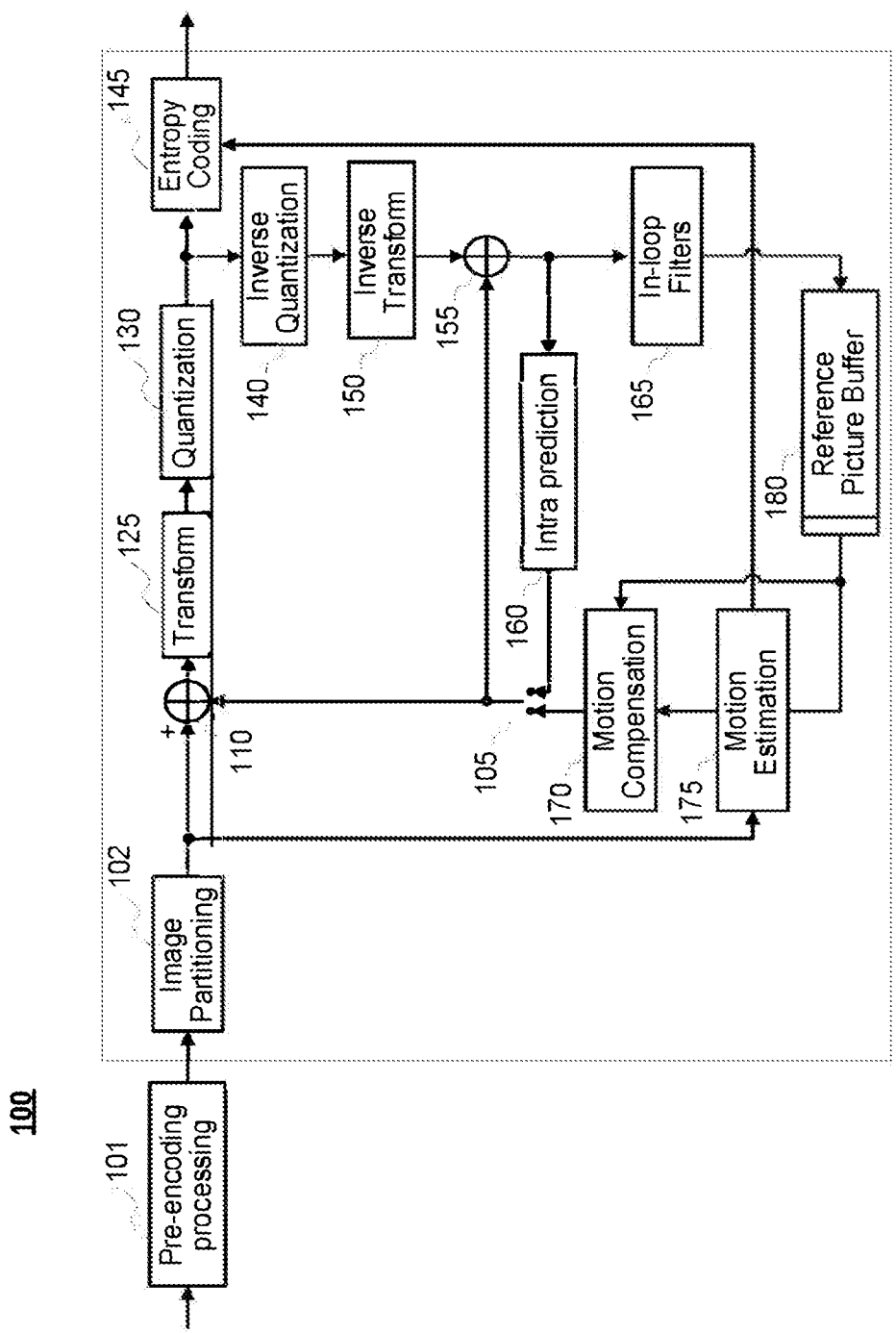
FIG. 6 illustrates a block diagram of a video encoder according to an embodiment.
Figure 7:
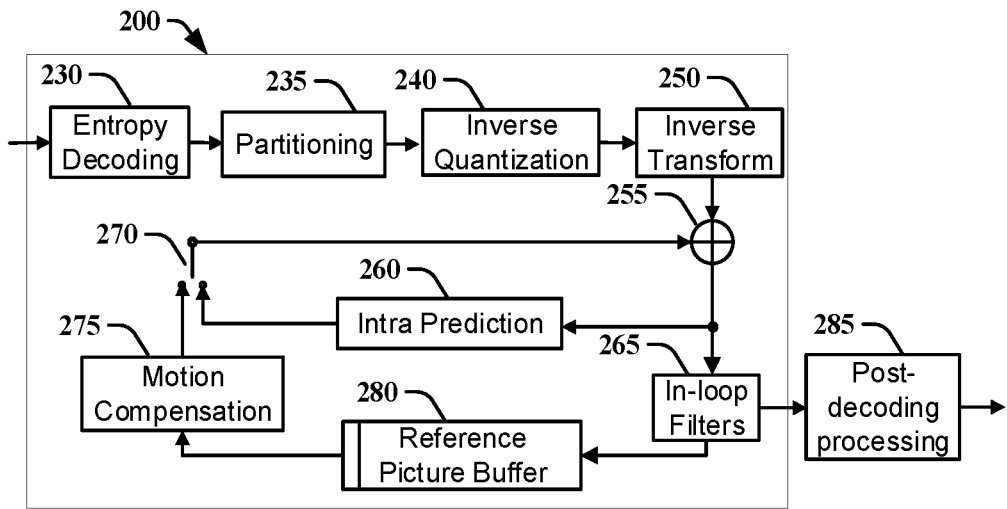
FIG. 7 illustrates a block diagram of a video decoder according to an embodiment.
Figure 8:
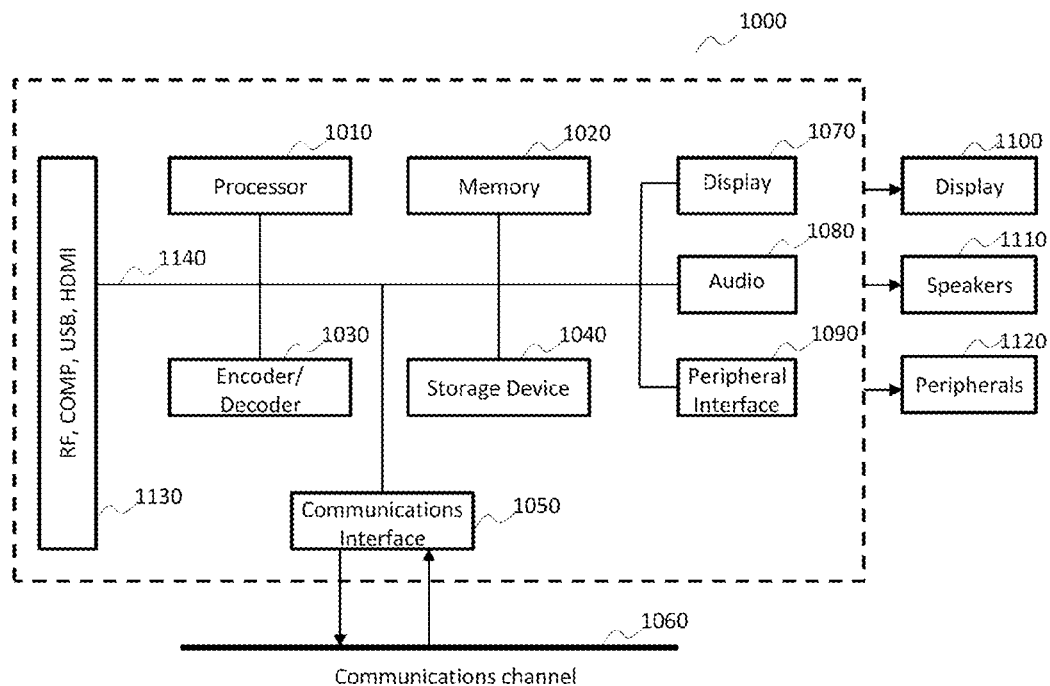
FIG. 8 illustrates a block diagram of an example of a system in which various aspects and embodiments are implemented.

The aspects described and contemplated in this application can be implemented in many different forms. FIGS. 6, 7 and 8 below provide some embodiments, but other embodiments are contemplated and the discussion of FIGS. 6, 7 and 8 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation, entropy coding, and/or decoding modules (170, 275, 145, 230), of a video encoder 100 and decoder 200 as shown in FIGS. 6 and 7. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the weights values w0 and w1 defined by table 1. The specific values are for example purposes and the aspects described are not limited to these specific values.

FIG. 6 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 7 illustrates a block diagram of a video decoder 200. In the decoder 200, a bitstream is decoded by the decoder elements as described below. Video decoder 200 generally performs a decoding pass reciprocal to the encoding pass as described in FIG. 8. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101).

The post-decoding processing can use metadata derived in the pre-encoding processing and signaled in the bitstream.

FIG. 8 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device).

System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, motion compensation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, motion compensation.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, gbi_index, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for GBI, e.g. gbi_index. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

decoding a high level syntax element indicating whether generalized bi-prediction may apply for decoding blocks of a picture;

the syntax element is decoded from a SPS, PPS, tile and/or a slice header.

the syntax element is decoded only in the case where weighted prediction is not used.

decoding an index representative of first and second generalized bi-prediction weights in the case where at least one syntax element decoded for the bi-predicted block indicates GBI is used for the bi-predicted the block.

Inserting in the signaling syntax elements that enable the decoder to identify whether generalized bi-prediction may apply for decoding blocks of the picture.

A bitstream or signal that includes one or more of the described syntax elements, or variations thereof Inserting in the signaling syntax elements that enable the decoder to adapt block prediction in a manner corresponding to that used by an encoder.

Creating and/or transmitting and/or receiving and/or decoding a bitstream or signal that includes one or more of the described syntax elements, or variations thereof A TV, set-top box, cell phone, tablet, or other electronic device that performs generalized bi-prediction according to any of the embodiments described.

A TV, set-top box, cell phone, tablet, or other electronic device that performs generalized bi-prediction according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs generalized bi-prediction according to any of the embodiments described.

A TV, set-top box, cell phone, tablet, or other electronic device that receives (e.g. using an antenna) a signal over the air that includes an encoded image, and performs generalized bi-prediction according to any of the embodiments described.

According to a general aspect of at least one embodiment, a method for decoding video data is presented. The method comprises:

decoding a first high level syntax element indicating whether weighted prediction applies and a second high level syntax element indicating whether generalized bi-prediction applies for predicting blocks;

deactivating one of weighted prediction and generalized bi-prediction at a block level in the case where both said first and second high level syntax elements indicate weighted prediction and generalized bi-prediction apply; and decoding said block responsive to said deactivation.

According to a general aspect of at least one embodiment, a decoding apparatus is presented. The apparatus comprises one or more processors configured to perform:

decoding a first high level syntax element indicating whether weighted prediction applies and a second high level syntax element indicating whether generalized bi-prediction applies for predicting blocks;

deactivating one of weighted prediction and generalized bi-prediction at a block level in the case where both said first and second high level syntax elements indicate weighted prediction and generalized bi-prediction apply; and decoding said block responsive to said deactivation.

According to a general aspect of at least one embodiment, a computer-readable medium is presented that includes instructions for causing one or more processors to perform:

decoding a first high level syntax element indicating whether weighted prediction applies and a second high level syntax element indicating whether generalized bi-prediction applies for predicting blocks;

deactivating one of weighted prediction and generalized bi-prediction at a block level in the case where both said first and second high level syntax elements indicate weighted prediction and generalized bi-prediction apply; and decoding said block responsive to said deactivation.

In an embodiment, the first and second high level syntax elements are decoded from a sequence parameter set, a picture parameter set, a tile header or from a slice header.

In an embodiment, the decoding method further comprises (the one or more processors of the decoding apparatus are further configured to perform) explicitly decoding at least one generalized bi-prediction parameter for said block only in the case where some conditions on said block are fulfilled and said second high level syntax element indicate to apply generalized bi-prediction.

In an embodiment, the decoding method further comprises (the one or more processors of the decoding apparatus are further configured to perform) decoding said second high level syntax element only in the case where said first high level syntax element indicates weighted prediction does not apply.

In an embodiment, deactivating one of weighted prediction and generalized bi-prediction at a block level comprises deactivating weighted prediction on said block in the case where the block is bi-predicted and weight values are equal to one and offset values are equal to zero.

In an embodiment, deactivating one of weighted prediction and generalized bi-prediction at a block level comprises deactivating generalized bi-prediction on said block in the case where the block is bi-predicted and at least one weight value is not equal to one or at least one offset value is not equal to zero.

According to a general aspect of at least one embodiment, a method for encoding video data is presented. The method comprises:
  encoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  encoding said block responsive to said deactivation.

According to a general aspect of at least one embodiment, an encoding apparatus is presented. The apparatus comprises one or more processors configured to perform:
  encoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  encoding said block responsive to said deactivation According to a general aspect of at least one embodiment, a computer-readable medium is presented that includes instructions for causing one or more processors to perform computer-readable medium including instructions for causing one or more processors to perform:
  encoding a first high level syntax element indicating whether weighted prediction applies and a second high level syntax element indicating whether generalized bi-prediction applies for predicting blocks;
  deactivating one of weighted prediction and generalized bi-prediction at a block level in the case where both said first and second high level syntax elements indicate weighted prediction and generalized bi-prediction apply; and
  encoding said block responsive to said deactivation.

A signal comprising data generated according to the encoding method or the encoding apparatus according to any of the embodiments is presented.

In an embodiment, said first and second high level syntax elements are encoded in a sequence parameter set, a picture parameter set or in a slice header.

In an embodiment, the encoding method further comprises (the one or more processors of the encoding apparatus are further configured to perform) explicitly encoding at least one generalized bi-prediction parameter for said block only in the case where some conditions on said block are fulfilled and said second high level syntax element indicates to apply generalized bi-prediction.

In an embodiment, the encoding method further comprises (the one or more processors of the encoding apparatus are further configured to perform) encoding said second high level syntax element only in the case where said first high level syntax element indicates weighted prediction does not apply.

In an embodiment, deactivating one of weighted prediction and generalized bi-prediction at a block level comprises deactivating weighted prediction on said block in the case where the block is bi-predicted and weight values are equal to one and offset values are equal to zero.

In an embodiment, deactivating one of weighted prediction and generalized bi-prediction at a block level comprises deactivating generalized bi-prediction on said block in the case where the block is bi-predicted and at least one weight value is not equal to one or at least one offset value is not equal to zero.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for creating, transmitting or receiving the bitstream generated according to the encoding methods described above. One or more embodiments also provide a computer program product including instructions for performing at least part of any of the methods described above.

The invention claimed is:

1. A decoding method comprising:
  obtaining a first value of a first high level syntax element, the first high level syntax element indicating whether a group-of-blocks level weighted prediction applies for predicting blocks, wherein a same weight is defined for weighting blocks of a group of reference blocks;
  obtaining a second value of a second high level syntax element, the second high level syntax element indicating whether a block-level generalized bi-prediction mode applies for predicting blocks, wherein a weight is defined for weighting a single reference block independently of any other block; and
  decoding a current block by applying the block-level generalized bi-prediction mode responsive to the first value indicating the group-of-blocks-level weighted prediction mode applies, the second value indicating the block-level generalized bi-prediction mode applies, and at least one parameter of the current block indicating that the block-level generalized bi-prediction mode applies to the current block and that weight values associated to the group-of-blocks-level weighted prediction mode equal to one and offset values associated to the group-of-blocks-level weighted prediction mode equal to zero.

2. The method of claim 1, wherein the first and second high level syntax elements are decoded from a sequence parameter set, a picture parameter set, a tile header or from a slice header.

3. The method of claim 1, further comprising decoding the at least one parameter responsive to a condition on the current block indicating whether the at least one parameter is coded explicitly is fulfilled and the second high level syntax element indicating the block-level generalized bi-prediction mode applies.

4. An encoding method comprising:
- obtaining a first value of a first high level syntax element, the first high level syntax element indicating whether a group-of-blocks level weighted prediction applies for predicting blocks, wherein a same weight is defined for weighting blocks of a group of reference blocks;
- obtaining a second value of a second high level syntax element, the second high level syntax element indicating whether a block-level generalized bi-prediction mode applies for predicting blocks, wherein a weight is defined for weighting a single reference block independently of any other block; and
- encoding a current block by applying the block-level generalized bi-prediction mode responsive to the first value indicating the group-of-blocks-level weighted prediction mode applies, the second value indicating the block-level generalized bi-prediction mode applies, and at least one parameter of the current block indicating that the block-level generalized bi-prediction mode applies to the current block and that weight values associated to the group-of-blocks-level weighted prediction mode equal to one and offset values associated to the group-of-blocks-level weighted prediction mode equal to zero.

5. The method of claim 4, wherein the first and second high level syntax elements are encoded in a sequence parameter set, a picture parameter set, a tile header or in a slice header.

6. The method of claim 4, further comprising encoding the at least one parameter responsive to a condition on the current block indicating whether the at least one parameter is coded explicitly is fulfilled and the second high level syntax element indicating the block-level generalized bi-prediction mode applies.

7. A decoding apparatus comprising:
- one or more processors configured to perform:
  - obtaining a first value of a first high level syntax element, the first high level syntax element indicating whether a group-of-blocks level weighted prediction applies for predicting blocks, wherein a same weight is defined for weighting blocks of a group of reference blocks;
  - obtaining a second value of a second high level syntax element, the second high level syntax element indicating whether a block-level generalized bi-prediction mode applies for predicting blocks, wherein a weight is defined for weighting a single reference block independently of any other block; and
  - decoding a current block by applying the block-level generalized bi-prediction mode responsive to the first value indicating the group-of-blocks-level weighted prediction mode applies, the second value indicating the block-level generalized bi-prediction mode applies, and at least one parameter of the current block indicating that the block-level generalized bi-prediction mode applies to the current block and that weight values associated to the group-of-blocks-level weighted prediction mode equal to one and offset values associated to the group-of-blocks-level weighted prediction mode equal to zero.

8. The decoding apparatus of claim 7, wherein the first and second high level syntax elements are decoded from a sequence parameter set, a picture parameter set, a tile header or from a slice header.

9. The decoding apparatus of claim 7, wherein the one or more processors are further configured to perform decoding the at least one parameter responsive to a condition on the current block indicating whether the at least one parameter is coded explicitly is fulfilled and the second high level syntax element indicating the block-level generalized bi-prediction mode applies.

10. An encoding apparatus comprising:
- one or more processors configured to perform:
  - obtaining a first value of a first high level syntax element, the first high level syntax element indicating whether a group-of-blocks level weighted prediction applies for predicting blocks, wherein a same weight is defined for weighting blocks of a group of reference blocks;
  - obtaining a second value of a second high level syntax element, the second high level syntax element indicating whether a block-level generalized bi-prediction mode applies for predicting blocks, wherein a weight is defined for weighting a single reference block independently of any other block; and
  - encoding a current block by applying the block-level generalized bi-prediction mode responsive to the first value indicating the group-of-blocks-level weighted prediction mode applies, the second value indicating the block-level generalized bi-prediction mode applies, and at least one parameter of the current block indicating that the block-level generalized bi-prediction mode applies to the current block and that weight values associated to the group-of-blocks-level weighted prediction mode equal to one and offset values associated to the group-of-blocks-level weighted prediction mode equal to zero.

11. The encoding apparatus of claim 10, wherein the first and second high level syntax elements are encoded in a sequence parameter set, a picture parameter set, a tile header or in a slice header.

12. The encoding apparatus of claim 10, wherein the one or more processors are further configured to perform encoding the at least one parameter responsive to a condition on the current block indicating whether the at least one parameter is coded explicitly is fulfilled and the second high level syntax element indicating the block-level generalized bi-prediction mode applies.

13. A non-transitory information storage medium storing instructions for implementing the method according to claim 1.

14. A non-transitory information storage medium storing instructions for implementing the method according to claim 4.

* * * * *